United States Patent [19]

Stahl et al.

[11] 4,153,470
[45] May 8, 1979

[54] PROCESS FOR PREPARING FOAMED GYPSUM AND CONSTRUCTIONAL ELEMENTS COMPOSED THEREOF

[75] Inventors: Dieter Stahl, Kriftel; Ernst Püchel, Hofheim, both of Fed. Rep. of Germany

[73] Assignee: Hoechst Aktiengesellschaft, Frankfurt am Main, Fed. Rep. of Germany

[21] Appl. No.: 907,360

[22] Filed: May 18, 1978

Related U.S. Application Data

[63] Continuation of Ser. No. 732,133, Oct. 13, 1976, abandoned.

[30] Foreign Application Priority Data

Oct. 15, 1975 [DE] Fed. Rep. of Germany ....... 2546181

[51] Int. Cl.$^2$ ............................................. C04B 11/14
[52] U.S. Cl. ................................................... 106/116
[58] Field of Search ................. 106/87, 111, 116, 315; 260/2.5 A, 2.5 AK, 2.5 BE

[56] References Cited

U.S. PATENT DOCUMENTS

3,878,278  4/1975  Miller ............................ 260/2.5 AK

Primary Examiner—James Poer
Attorney, Agent, or Firm—Curtis, Morris & Safford

[57] ABSTRACT

Foamed gypsum is produced by mixing gypsum with water in the presence of additives serving for liquefying the gypsum and for adjusting the starting period, and by adding thereto a mixture of isocyanate compounds and polyurethane preadducts.

After a starting period of about five minutes a foaming process occurs, which is completed after about 20 minutes and furnishes a foamed gypsum after setting. The foamed gypsum has a density from 0.45 to 0.8 g/cc, whereas unfoamed gypsum has a density of 1.66 g/cc.

The process may be performed in special molds, so that after setting specially formed elements are obtained, e.g. sandwich elements.

4 Claims, No Drawings

PROCESS FOR PREPARING FOAMED GYPSUM AND CONSTRUCTIONAL ELEMENTS COMPOSED THEREOF

This is a continuation, of application Ser. No. 732,133, filed Oct. 13, 1976, now abandoned.

The present invention relates to a process for the manufacture of foamed gypsum and structural elements composed thereof.

Gypsum is used increasingly as rapidly setting engineering material in the construction industry, especially for the manufacture of wall boards and other structural elements. These constructional elements based on gypsum, however, have a relatively high weight because of their compact structure and a relatively low thermal insulation. These disadvantages can be avoided when using a type of gypsum showing a porous structure after setting. Another factor favoring the use of such types of foamed gypsum is their higher flame resistance as compared to foamed plastics likewise used in the construction industry.

The present invention consequently was confronted with the task of developing a process for the manufacture of foamed gypsum and structural elements composed thereof.

It is already known to prepare foamed gypsum by foaming gypsum with the addition of a carbonate and an acid. This foaming reaction, however, takes place so rapidly that the processing time remaining to the manufacture is not sufficient. (Baustoffindustrie (1970), number 1, page 23-26).

Porous types of gypsum are also known, which are prepared by incorporating previously prepared foamed dispersants into a gypsum-water mixture ready for setting. These types of foamed gypsum however have a very low stability and a very low adhesion on cover sheets so that they are unsuitable for the manufacture of sandwich elements.

A process has now been found which avoids the aforesaid disadvantages and which has the following advantages:

foaming takes place slowly while a low foaming pressure is formed. The processer thus has a working time of about 5 minutes as in the case of plastics foamed on the site. Moreover, in the preparation of structural elements, for example of sandwich elements, all zones of the charge cavity are filled without formation of bubbles owing to the foaming pressure.

It now has been found that a foaming process can be initiated by adding from 1 to 30, preferably from 5 to 7% by weight, of a polyurethane pre-adduct to the paste of plaster and subsequent intensive mixing.

The process starts after about 3 to 5 minutes and is completed after about 20 minutes and furnishes a foamed gypsum after setting having a density from 0.45 to 0.8 g/cc, whereas unfoamed gypsum has a density of 1.66 g/cc.

The process according to the invention comprises mixing gypsum with water in the presence of an additive serving for liquefying the gypsum and for adjusting the starting and the setting times, introducing by dispersion into the gypsum-water mixture formed from 1 to 30% by weight, calculated on gypsum, of a mixture of isocyanate compounds and polyurethane preadducts comprising an excess of isocyanate compounds having one or several compounds selected from the group of OH group-containing polyesters, polyethers and amino group-containing compounds, in the presence of foam stabilizing additives, which mixture foams after a certain starting time and sets after the foaming reaction is terminated.

Suitable types of gypsum within the scope of the present invention are all hydraulically setting calcium sulfate modifications showing a neutral or slightly acid reaction, which are used in the conventional pulverulent form (diameter of the grains from 5 to 100 μm). Commercial types of gypsum having a water-gypsum factor of 0.3 are preferably used in order to keep the portion of mixing water not reacting with the gypsum as low as possible.

Polyurethane pre-adducts within the scope of the present invention comprise (in accordance with "Kunststoff-Handbuch," editor Carl Hanser, Munich 1966, pages 27, 76 and 84) polyesters and polyethers, the chains of which have been lengthened by the addition of isocyanates.

The preadducts are preferably used in an amount from 5 to 20%, calculated on gypsum. When using less than 5% of preadducts the optimal density cannot be attained and when using more than 20% the structure of the pores of gypsum may be destroyed with resultant reduction of its stability.

The composition of the preadducts may vary within a wide range. The preadducts may be prepared in known manner by the reaction of polyesters and/or polyethers with an excess of isocyanate with the exclusion of water and optionally in the presence of a catalyst. Although preadducts suitable for soft foam as well as those suitable for rigid foam may be used according to the present invention contrary to what had been expected, it has become evident that commercial preadducts generally only used for the preparation of polyurethane elastomers are especially appropriate. Suitable preadducts for example have an average molecular weight of about 2,000 and an OH number from about 50 to 60. Preadducts having a different molecular weight and different OH numbers, however, may also be used. These preadducts to be used for the formation of elastomers should advantageously be storable, for example for a period from half a year to one year, without deterioration of their reactivity.

Suitable isocyanate compounds are for example: toluylene-di- or -tri-isocyanate; m-xylylene-diisocyanate,-tetraisocyanate; hexamethylene-diisocyanate; diisocyanatediphenyl ethers; 4,4'-diisopropyl-cyanateodiphenyl; 4,4'-diisocyanato-3,3'-dichlorodiphenyl; 4,4'-diisocyanato-3,3'-dimethoxydiphenyl; 4,4'-diisocyanato-3,3'-dimethyldiphenyl; 4,4'-diisocyanato-3,3'-diphenyldiphenyl; 4,4'-diisocyanato-diphenylmethane; 4,4'-diisocyanato-3,5'-dimethyldiphenylmethane; naphthylene-1,5-diisocyanate; N,N'-(4,4'-dimethyl-3,3'-diisocyanatodiphenyl)uretdione; 2,4,4'-triisocyanatodiphenyl ether.

Suitable polyester or polyether components are straight chain or branched types, preferably of low molecular weight, for example based on dicarboxylic acids, for example adipic acid, phthalic acid or the like, and at least a bivalent alcohol, for example ethylene glycol, moreover the different propanediols, butanediols, oligomers of ethylene glycol or propylene glycol, moreover glycerine, trimethylol ethane, trimethylol propane, hexanetriol, pentaerythritol, sorbite or the like. The polyester and polyether components generally have free OH groups.

The preadducts should contain an amount of isocyanate compounds exceeding that required for the formation of the urethane resin. The formation of urethane resin takes place according to the following scheme:

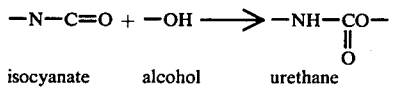

The residual isocyanate groups react with water with the formation of unstable carbamidic acid derivatives, decomposing into urea compounds with splitting off of $CO_2$.

The primary amino group of the urea compound reacts in its turn with isocyanate with the formation of ureide, which is converted into biuret with a further isocyanate group and causes the tridimensional cross-linking of the molecule.

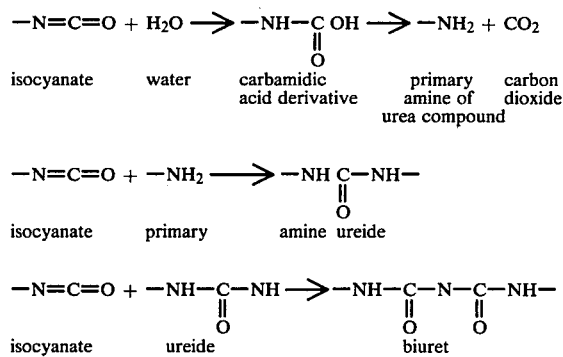

When adding the preadduct to the gypsum-water mixture according to the invention the excess of isocyanate reacts with a part of the excess of water, i.e. the water not required for setting of the gypsum. Thus carbon dioxide is liberated acting as a foaming agent for the gypsum-water-artificial resin-mixture.

The quantity of water to be used must be such that the gypsum-water-artifical resin mixture is a stirrable and expandable paste. In order to keep that part of the water, which is not required for setting of the gypsum and for the reaction with the excess of isocyanate, as low as possible, gypsum liquefiers are advantageously used. The gypsum-water factor may be reduced from 0.3 to 0.25 by the addition from 0.1 to 3% by weight, especially of 0.5%, calculated on gypsum, of a melamine resin, especially of sulfonic acid modified melamine resins.

In order to avoid setting of the gypsum before the foaming reaction is terminated, retarder must be added to the paste of plaster. Carboxymethylcellulose which has proved advantageous for this purpose, which may be added in an amount from 0.1 to 2%, preferably 0.5% by weight, calculated on gypsum, in the form of an 8% aqueous solution.

On the other hand, the foam reaction should begin only after a starting period of about 5 minutes in order to allow the processer to mix carefully and to fill the mixture into the molds intended for use. For adjusting the starting period there is used an accelerator absorbed on zeolite powder in order to diminish its action. Suitable accelerators are for example dibutyl tin laurate on zeolite powder in a ratio from 1:2 to 1:10, preferably of 1:7. There is used an amount from 0.1 to 2% by weight, preferably of 0.8%, calculated on polyurethane preadduct.

The foaming reaction may be intensified by using previously heated mixing water. A water temperature from 30 to 70° C., preferably of 50° C. leads to better foaming and, consequently, lower foam densities.

In order to avoid a collapsing of the expanded foam which has not yet set, even partially, foam stabilizers are used advantageously. Commercial silicon compounds or methylcellulose used in an amount from 0.1 to 2% by weight, calculated on the polyurethane preadduct have proved advantageous for this purpose. Methyl cellulose is used in the form of a 1 to 8% aqueous solution.

A higher foaming and, consequently, a lower density, may be attained when adding from 1 to 30% by weight, preferably 10%, calculated on the polyurethane preadduct, of one or several fluorinated hydrocarbons.

In a special method of carrying out the process of the invention the foamed gypsum produced by the aforesaid process is foamed in special molds and allowed to cure so that specially formed structural elements are obtained. The foamed gypsum according to the invention especially allows manufacturing sandwich elements in a simple process in suitable flask molds while using suitable cover sheets made from materials impermeable to steam, such as hard boards, chip boards, or asbestos cement boards in suitable flask molds.

For this purpose a cover sheet is placed in a flask mold as ground sheet, the gypsum-water-preadduct mixture is filled in and a second cover sheet is placed on the mixture. The foaming gypsum firstly completely fills the cavity between both cover sheets and then drives the cover sheet placed on the top upwards uniformously possibly against an upper limit so that a parallel position of the cover sheets is assured. The sandwich element thus formed has cured after 3 hours to such a degree that it can be withdrawn from the mold.

Although the aforesaid polyurethane preadducts already have a good adhesion, additional bonding agents are advantageously added to the mixture in the preparation of sandwich elements. As such there may be used redispersable plastic powders, for example redispersable polyvinyl acetate powders or polyvinyl alcohol, used in an amount from 0.1 to 0.5% by weight, preferably of 0.2%.

The foamed gypsum may be prepared continuously in a multicomponent foaming device. The components contain the following constituents: component A: gypsum, liquefier and accelerating absorbent and foam stabilizers are stirred with water to give a slurry. component B: polyurethane preadduct.

Both components are introduced by means of pumps into a mixing device and expelled as an expandable composition, for example in a series of flask molds suitable for the preparation of sandwich structures.

The following example illustrates the invention: A paste of plaster was prepared with the ratios indicated in the tables. The paste of plaster contained the liquefier and the retarder, into which the polyurethane preadduct had been introduced by stirring with the other additives, for example the accelerators and the stabilizers. The expandable mixtures were than cast in flasks of the same base, where they expanded up to a varying height to cure thereafter. After 24 hours the density of the individual molded articles was measured and compared with a batch prepared without the addition of polyurethane preadduct. The results are listed in the following table:

|  | 0 | 1 | 2 | 3 | 4 | 5 | 6 | 7 | 8 | 9 | 10 |
|---|---|---|---|---|---|---|---|---|---|---|---|
| α-semi-hydrate gypsum kg | 3.5 | 3.5 | 3.5 | 3.5 | 3.5 | 3.5 | 3.5 | 3.5 | 3.5 | 3.5 | 3.5 |
| water-gypsum factor | 0.3 | 0.5 | 0.5 | 0.5 | 0.5 | 0.5 | 0.5 | 0.3 | 0.3 | 0.3 | 0.3 |
| gypsum liquifier g sulfonic acid modified melamine resin | 17.5 | 17.5 | 17.5 | 17.5 | 17.5 | 17.5 | 17.5 | 17.5 | 17.5 | 17.5 | 17.5 |
| retarder g carboxymethylcellulose 8% solution in water | 20 | 20 | 20 | 20 | 20 | 20 | 20 | 20 | 20 | 20 | 20 |
| water 20° C. kg | — | — | — | — | — | — | — | — | 0.85 | — | — |
| water 47° C. kg | 0.85 | 1.4 | 1.4 | 1.4 | 1.4 | 1.4 | 1.4 | 0.85 | — | 0.85 | 0.85 |
| polyurethane preadduct g | — | 35 | 70 | 105 | 140 | 175 | 210 | 210 | 210 | 210 | 210 |
| accelerating absorbent g dibutyl tin laurate | — | 0.3 | 0.6 | 0.9 | 1.2 | 1.5 | 1.8 | 1.8 | 1.8 | 1.8 | 0.4 |
| foam stabilizer silicon compound g | — | 0.35 | 0.7 | 1.05 | 0.7 | 1.75 | 2.1 | 2 | — | 2 | — |
| methylcellulose g | — | — | — | — | 0.7 | — | — | — | 2 | — | 2 |
| foaming additive g trichlorofluoromethane | — | — | — | — | — | — | — | — | — | 13 | — |
| starting time min. | — | 4 | 4 | 4 | 4 | 4 | 4 | 4 | 6 | 4 | 4 |
| setting time min. | 150 | 150 | 150 | 150 | 150 | 150 | 150 | 150 | 150 | 150 | 150 |
| density after 24 hrs. g/cm$^3$ | 1.66 | 1.4 | 1.01 | 0.83 | 0.75 | 0.63 | 0.5 | 0.49 | 0.60 | 0.45 | 0.46 |

What is claimed is:

1. A process for the manufacture of foamed gypsum and structural elements composed thereof which comprises mixing gypsum with water in the presence of an additive for plasticizing the gypsum to produce a plaster paste and for adjusting the paste setting time, said additive being a melamine resin, incorporating by dispersion into the gypsum-water mixture, from 1 to 30 percent calculated on the weight of gypsum, of a preadduct composed of a mixture of a reactant of an isocyanate with a hydroxy or amino group containing polyester or polyether and excess isocyanate and foaming the gypsum-water mixture before it sets.

2. The process defined in claim 1 in which the additive for plasticizing is a sulfonic acid modified melamine resin and said additive is present in an amount from 0.1 percent to 3 percent calculated on the weight of gypsum.

3. The process defined in claim 1 which comprises adding to the gypsum or the polyurethane preadduct a dibutyl tin compound in an amount from 0.1 to 2 percent by weight, calculated on the polyurethane preadduct, to adjust the length of the starting period after which the foaming reaction begins.

4. The process as defined in claim 1 which comprises adding to the gypsum or the polyurethane preadduct dibutyl tin laurate in an amount from 0.1 to 2 percent by weight, calculated on the polyurethane preadduct, to adjust the length of the starting period after which the foaming reaction begins.

* * * * *